United States Patent
Ma et al.

(10) Patent No.: US 8,429,130 B2
(45) Date of Patent: *Apr. 23, 2013

(54) OPTIMIZED PREFETCHING FOR WIDE AREA NETWORKS

(75) Inventors: Qingming Ma, San Jose, CA (US); Krishna Narayanaswamy, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,645

(22) Filed: May 24, 2012

(65) Prior Publication Data

US 2012/0233261 A1    Sep. 13, 2012

Related U.S. Application Data

(63) Continuation of application No. 12/211,167, filed on Sep. 16, 2008, now Pat. No. 8,209,291.

(51) Int. Cl.
*G06F 7/00* (2006.01)

(52) U.S. Cl.
USPC ........... 707/644; 707/641; 707/692; 711/118; 711/213; 709/207; 709/219

(58) Field of Classification Search ........................ None
See application file for complete search history.

(56) References Cited

U.S. PATENT DOCUMENTS

| | | | |
|---|---|---|---|
| 6,760,816 B1 * | 7/2004 | Ju et al. | 711/137 |
| 2003/0126232 A1 * | 7/2003 | Mogul et al. | 709/219 |
| 2004/0268051 A1 | 12/2004 | Berg et al. | |
| 2007/0255844 A1 * | 11/2007 | Shen et al. | 709/231 |
| 2008/0005057 A1 * | 1/2008 | Ozzie et al. | 707/1 |
| 2008/0005736 A1 * | 1/2008 | Apacible et al. | 718/100 |
| 2008/0243268 A1 | 10/2008 | Kandaswamy et al. | |
| 2009/0100228 A1 * | 4/2009 | Lepeska et al. | 711/125 |

OTHER PUBLICATIONS

U.S. Appl. No. 12/211,167, filed Sep. 16, 2008, to Qingming MA et al., entitled "Optimized Prefetching for Wide Area Networks" (38 pages).

* cited by examiner

*Primary Examiner* — Mohammad S Rostami
(74) *Attorney, Agent, or Firm* — Harrity & Harrity, LLP (57) ABSTRACT

A data prefetching technique uses predefined prefetching criteria and prefetching models to identify and retrieve prefetched data. A prefetching model that defines data to be prefetched via a network may be stored. It may be determined whether prefetching initiation criteria have been satisfied. Data for prefetching may be identified based on the prefetching model when the prefetching initiation criteria have been satisfied. The identified data may be prefetched, via the network, based on the prefetching model.

20 Claims, 9 Drawing Sheets

OPTIMIZED PREFETCHING FOR WIDE AREA NETWORKS

RELATED APPLICATION

This application is a continuation of U.S. patent application Ser. No. 12/211,167, filed Sep. 16, 2008, the contents of which are incorporated herein by reference.

BACKGROUND OF THE INVENTION

A. Field of the Invention

Concepts described herein relate generally to data prefetching, and more particularly, to optimizing prefetching over wide area networks (WANs).

B. Description of Related Art

Geographically distributed entities, such as a business with multiple local offices in different locations, frequently desire to maintain a logically unified proprietary network that is accessible by all of the geographically distributed entities. To accomplish this, a wide area network (WAN) may be used to link the different locations.

Information technology (IT) managers within geographically distributed entities face the conflicting requirements of keeping costs in check while providing users with new and faster applications. This conflict is most acute on the WAN, where costs can be high and getting applications to perform well is hampered by limited bandwidth and high latency.

Solutions are known to help improve performance over the WAN portion of a network. These solutions may be based on a number of technologies, including data compression, data caching, application-specific acceleration, policy-based bandwidth allocation, and data prefetching.

Data prefetching, in particular, may be used to reduce the perceived latency (response time) of data being accessed over a WAN. In general, the phrase data prefetching may include requesting and retrieving data in advance of an actual user or application-level request. One problem encountered when prefetching data is the determination of what data to prefetch, as well as when and how frequently to perform the prefetching operation. On one hand, prefetching unnecessary data may result in wasted resources, while prefetching too frequently results in decreased performance for system users.

SUMMARY

According to one implementation described herein, a method may include storing a prefetching model that defines data to be prefetched via a network; determining whether prefetching initiation criteria have been satisfied; identifying data for prefetching based on the prefetching model when the prefetching initiation criteria have been satisfied; and prefetching the identified data, via the network, based on the prefetching model.

According to another implementation, a device may include a first network interface to connect the device to a first network; a processor; a storage to store a prefetching model that defines data to be prefetched via the second network interface; and a second network interface to connect the device to a second network. The processor may be configured to determine whether prefetching initiation criteria have been satisfied; identify data for prefetching based on the prefetching model when the prefetching initiation criteria have been satisfied; and transmit a request for the identified data, via the second network interface, based on the prefetching model.

According to yet another implementation, a method may include receiving, from a client-side network device, prefetching instructions that define data to be retrieved; identifying data for retrieval based on the received prefetching instructions; retrieving the identified data from a local data source; and storing the retrieved data for transmission to the client-side network device.

According to still another implementation, a method may include storing a prefetching model that defines data to be prefetched via a network; identifying data for retrieval based on the prefetching model; retrieving the identified data from a local data source; and storing the retrieved data for transmission to a client-side network device.

According to another implementation, a system for prefetching data may include a client-side network device; a first network associated with the client-side network device; a server-side network device; and a second network connecting the client-side network device and the server-side network device. The client-side network device may be configured to store a prefetching model that defines data to be prefetched via the server-side network device; determine whether prefetching initiation criteria have been satisfied; identify data for prefetching based on the prefetching model when the prefetching initiation criteria have been satisfied; transmit, to the server-side network device via the second network, a request for the identified data; receive the identified data from the server-side network device via the second device; and store the received data in a cache.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of preferred embodiments refers to the accompanying drawings. The same reference numbers in different drawings may identify the same or similar elements. Also, the following detailed description does not limit the invention. Instead, the scope of the invention is defined by the appended claims and equivalents.

As described herein, a network optimization device may operate to increase application performance over a network by prefetching data over the network. The network optimization device may perform prefetching based on application-specific prefetching models. Each application-specific prefetching model may include information that defines the data to be prefetched as well as aging characteristics to be applied to the data upon retrieval. In addition, the network optimization device may initially determine whether prefetching criteria have been satisfied before beginning a prefetching operation. For example, prefetching criteria may specify the time of day, the processor load associated with the network optimization device, as well as the activity level on network interfaces involved in the prefetching operation.

Exemplary System Overview

Figure 1:
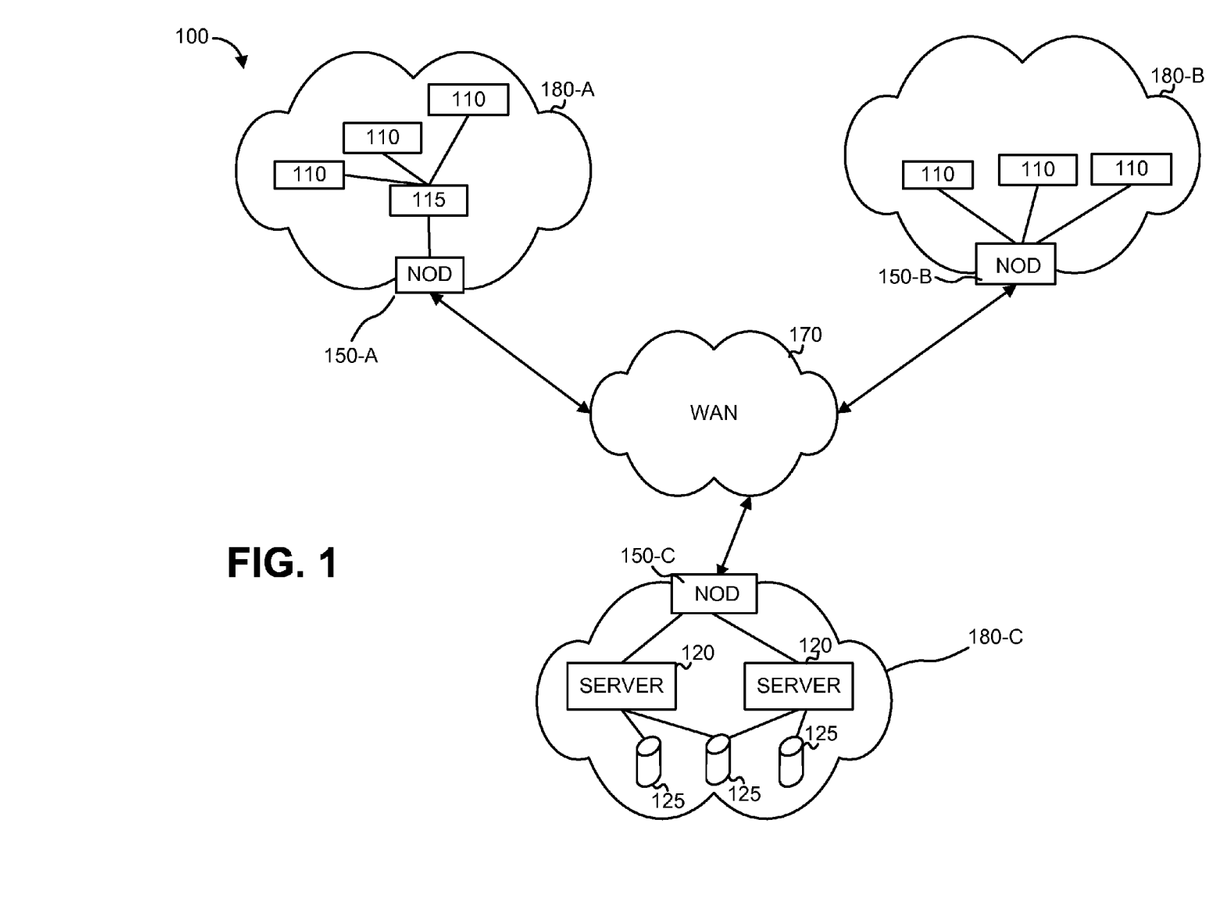
FIG. 1 is a diagram of an exemplary system.

FIG. 1 is a diagram of an exemplary system 100. System 100 may include a wide area network (WAN) 170 and one or more private networks 180-A, 180-B, and 180-C (collectively referred to as private networks 180). Private networks 180 may be geographically dispersed and different ones of private networks 180 may wish to communicate with one another over WAN 170. Private networks 180 may each, for example, be a local area network (LAN) for a branch office associated with a corporation or other entity. As another example, private networks 180-A and 180-B may be LANs for a corporate branch office and private network 180-C may be a data center for the corporation.

WAN 170 may include a public network, such as the Internet. In some implementations, WAN 170 may be implemented by privately owned or leased data lines between private networks 180, or by a combination of a public network and privately owned or leased data lines. In general, data traffic between private networks 180 through WAN 170 may be characterized by one or more of increased cost, higher latency, or lower bandwidth than data traffic within a single corporate network 180. Accordingly, network applications accessing resources between private networks 180 and across WAN 170 may tend to run less optimally than an application running locally at a private network 180. For example, slowdowns or bottlenecks in WAN 170 may tend to increase latency when accessing data resources across WAN 170.

Private networks 180 may each include a number of computing devices, such as, for example, client computing stations 110, network security device(s) 115, servers 120, and databases 125. Client computing stations 110 may include computing devices of end-users, such as desktop computers or laptops. Network security devices 115 may include, for example, firewalls or other devices relating to network security. Servers 120 may include one or more devices designed to interact with and deliver information to other devices, such as client computing stations 110. Servers 120 may, for example, serve data files or network applications to computing stations 110 over WAN 170. Servers may interact with databases 125 when providing information to client computing stations 110.

In the exemplary system shown in FIG. 1, private networks 180-A and 180-B may be branch offices that include a number of client computing stations 110 and private network 180-C may function as a data center that includes a number of servers 120, which may include file servers for private networks 180-A and 180-B. It should be recognized that the number of private networks shown in FIG. 1 (three), the elements (e.g., computers, routers, servers, security devices, etc.) associated with each private network and/or the functionality of each private network is exemplary.

Consistent with implementations described herein, private networks may be associated with network optimization devices (NODs) 150-A through 150-C (collectively referred to as network optimization devices 150). As shown in FIG. 1, for example, each of private networks 180-A through 180-C may be associated with a corresponding network optimization device 150-A, 150-B, and 150-C, respectively. Network optimization devices 150 may generally operate to enhance the performance of applications running over WAN 170 between various ones of private networks 180. For example, assume that a user at one of client computing stations 110 at private network 180-A would like to retrieve a file from a file server at private network 180-C. In this situation, network optimization devices 150-A and 150-C may operate to decrease the perceived latency and/or increase the perceived bandwidth of WAN 170 by providing, for example, data compression, data caching, and data prefetching services over WAN 170. Aspects of network optimization devices 150 as they relate to data prefetching will be particularly described in more detail herein.

Exemplary Device Architecture

Figure 2:
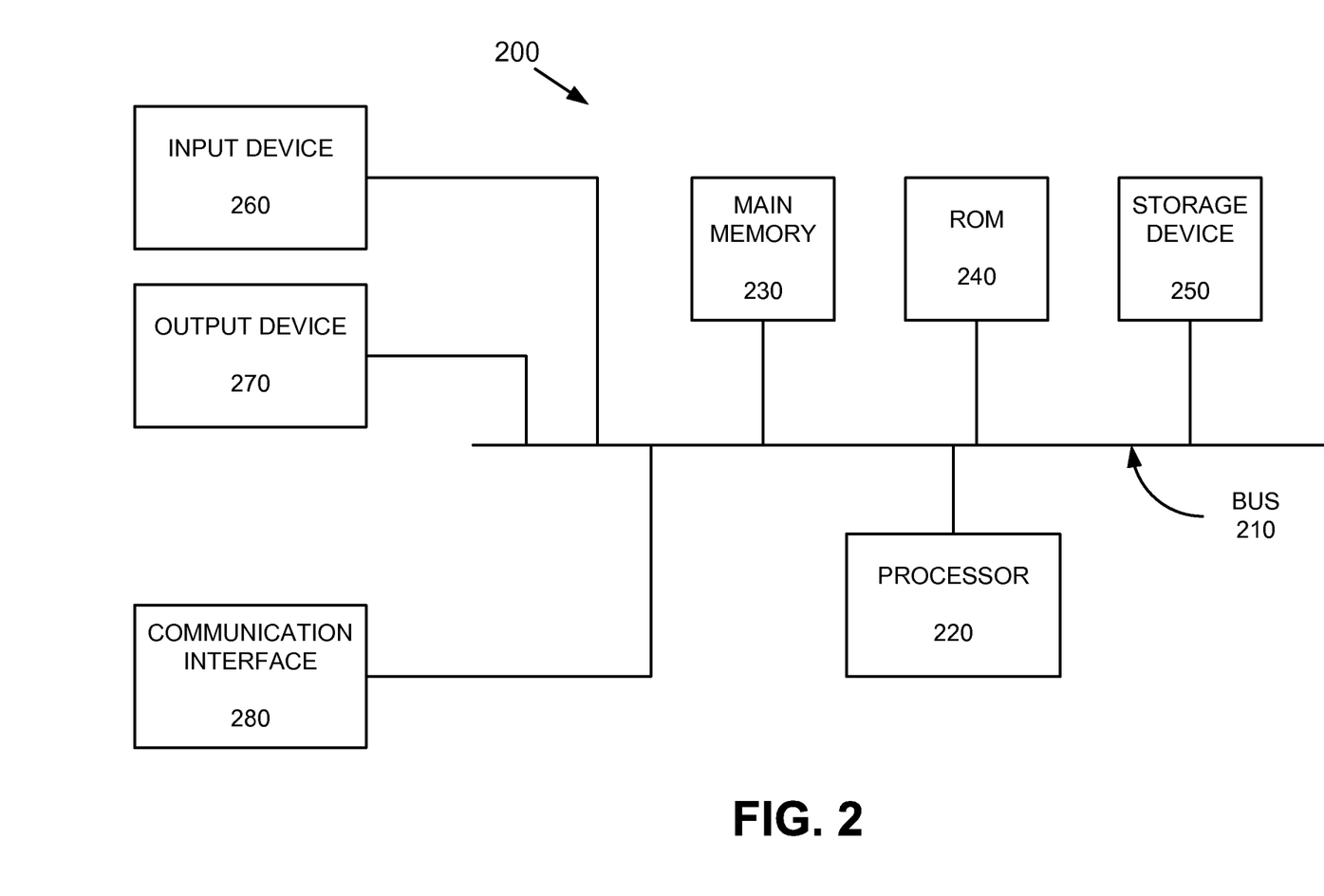
FIG. 2 is a block diagram of an exemplary device shown in FIG. 1.

FIG. 2 is a block diagram of an exemplary device 200, which may correspond to one or more of client computing stations 110, network security device 115, a server 120, a database 125, or a network optimization device 150. Device 200 may include a bus 210, a processor 220, a main memory 230, a read only memory (ROM) 240, a storage device 250, an input device 260, an output device 270, and a communication interface 280. Bus 210 may include a path that permits communication among the elements of the device.

Processor 220 may include a processor, microprocessor, or processing logic that may interpret and execute instructions. Main memory 230 may include a random access memory (RAM) or another type of dynamic storage device that may store information and instructions for execution by processor 220. ROM 240 may include a ROM device or another type of static storage device that may store static information and instructions for use by processor 220. Storage device 250 may include a magnetic and/or optical recording medium and its corresponding drive.

Input device 260 may include a mechanism that permits an operator to input information to the device, such as a keyboard, a mouse, a pen, voice recognition and/or biometric mechanisms, etc. Output device 270 may include a mechanism that outputs information to the operator, including a display, a printer, a speaker, etc. Communication interface 280 may include any transceiver-like mechanism that enables the device to communicate with other devices and/or systems.

Device 200 may perform certain operations, as described in detail below. The device may perform these operations in response to processor 220 executing software instructions contained in a computer-readable medium, such as memory 230. A computer-readable medium may be defined as a physical or logical memory device.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Prefetch Operations

In accordance with one implementation described herein, a perceived decrease in network latency and enhanced optimization efficiency may be obtained by providing application-aware data prefetching in the manner set forth in detail below. More specifically, one or more network optimization devices 150 may identify and prefetch data over WAN 170 during offpeak times, when network utilization is lower than at peak times. Moreover, decisions regarding a type and/or frequency of prefetching operations may be made based on one or more prefetching models associated with applications and/or users in order to increase the efficiency and utilization of the prefetched data. In this manner, network bandwidth may be more optimally used over an entire operating timeframe and the data identified for prefetching may be more efficiently used.

Figure 3A:
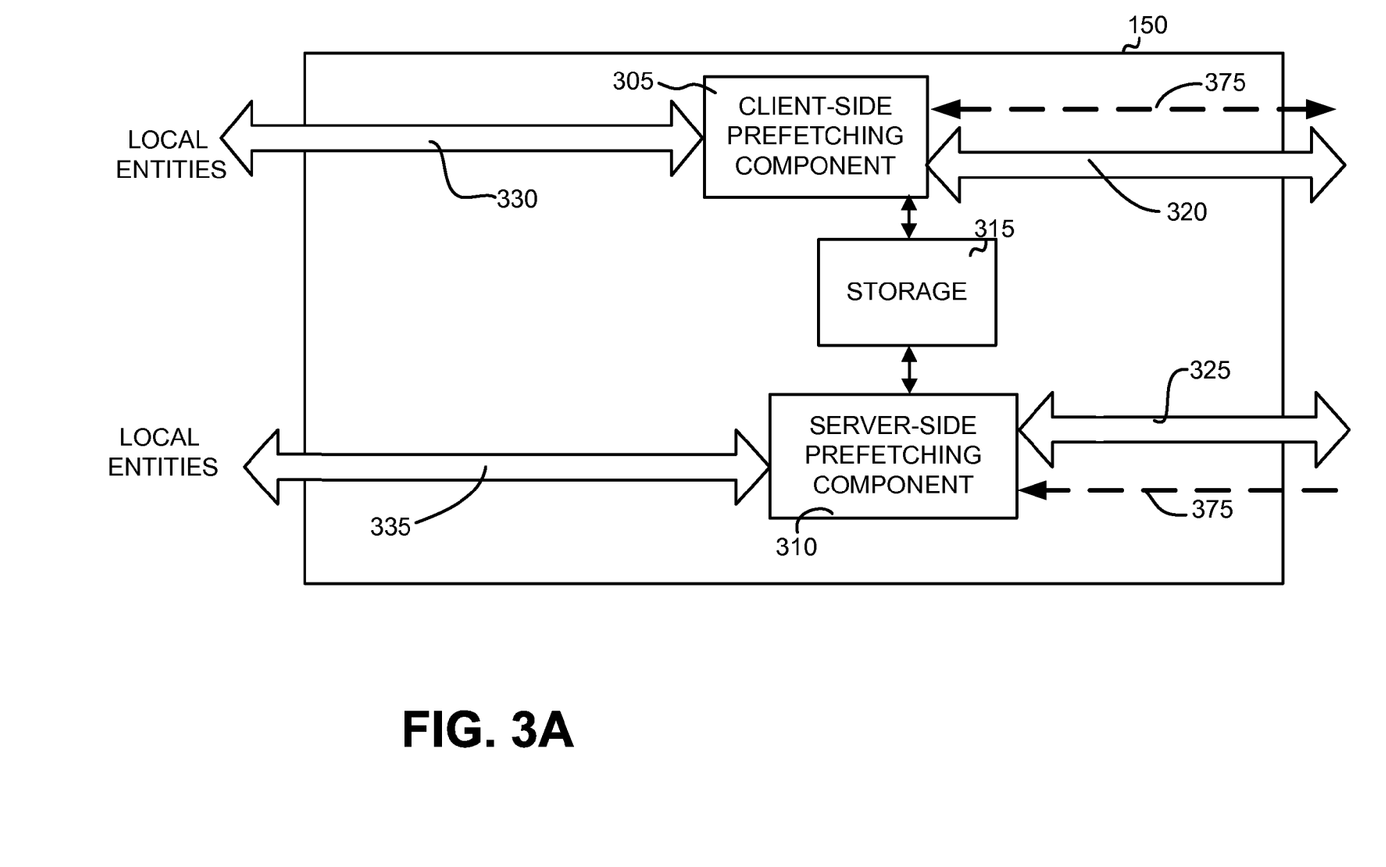
FIGS. 3A-3C are diagrams conceptually illustrating exemplary elements of one of the network optimization devices of FIG. 1.
Figure 3B:
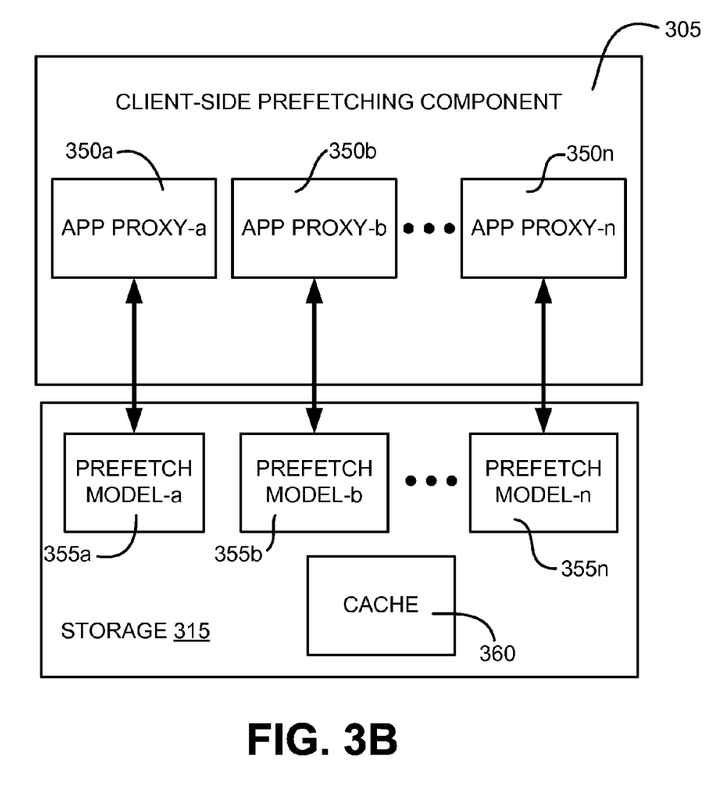
Figure 3C:
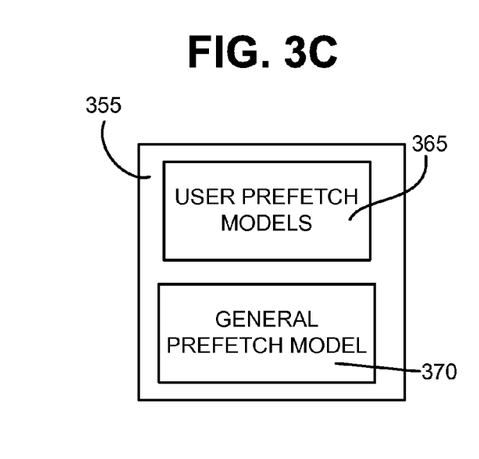

FIGS. 3A-3C are diagrams conceptually illustrating exemplary elements of one of network optimization devices 150. Network optimization device 150 may include client-side prefetching component 305, server-side prefetching component 310, storage 315, an outgoing WAN interface 320, an incoming WAN interface 325, an incoming private network interface 330, and an outgoing private network interface 335.

Client-side prefetching component 305, alone, or in combination with a server-side prefetching component 310 of another network optimization device 150, may perform application-based prefetching of data for entities transferring data through network optimization device 150. An entity, as used herein, may refer to any distinguishable unit that uses network optimization device 150, such as a computer, a process, or a group of computers/processes connected to network optimization device, e.g., via incoming private network interface 330. Although shown as discrete components in FIG. 3A, it should be appreciated that each of client-side prefetching component 305 and server-side prefetching component 310 may be implemented using one or more physical or logical elements. Alternatively, client-side prefetching component 305 and server-side prefetching component 310 may be combined as a single component.

As shown in FIG. 3B, client-side prefetching component 305 may further include a number (n) of application proxy components 350a, 350b, to 350n (collectively referred to as "application proxies 350", or individually referred to as "application proxy 350"). Storage 315 may be configured to maintain a corresponding number of prefetching models (also referred to as "profiles") 355a, 355b, to 355n (collectively referred to as "prefetching models 355", or individually referred to as "prefetching model 355") and a cache 360. Each application proxy component 350 may be associated with a network application running on a client-side device (e.g., devices 110, 115, and 120), connected to network optimization device, via, for example private network 180 and incoming private network interface 330. Exemplary applications may include email client applications, word processing applications, spreadsheet applications, database management tools, web browser applications, document management tools, etc. Further, each application proxy component 350 may be associated with a corresponding prefetching model 355 for assisting application proxy component 350 in determining whether, and in what manner, to prefetch data for a particular application. For example, application proxy component 350a may be associated with an email client application and a prefetching model 355a. Prefetching model 355a may be configured to instruct application proxy component 350a to prefetch all new email from an associated email server at 5:00 AM each weekday.

As illustrated in FIG. 3C, each prefetching model 355 may be further configured to include one or more user-specific prefetching models 365 and a general prefetching model 370. As will be described in additional detail below, user-specific prefetching models 365 may include information associated with a unique user or group of users, such as the user's personnel status (new hire, executive, administrative, etc.), past data retrieval history or patterns, user-assigned keywords (to base document retrieval on), etc. In one implementation, client-side prefetching component 305 may be provided with a user interface for receiving prefetching criteria from a user. For example, a user may instruct client-side prefetching component 305 to retrieve a particular file on a daily basis. This information may be included within the user-specific prefetching model 370 associated with the corresponding application proxy component 350.

General prefetching model 370 may include prefetching criteria associated with application data on a general level that does not include user-level elements or criteria. Exemplary general application-level prefetching criteria may include, for example, historical application-based document retrieval patterns for a multitude of users, document type definitions, prefetching exclusions, etc.

In one implementation consistent with embodiments described herein, client-side prefetching component 305 and server-side prefetching component 310 may store prefetching models 355 and cache 360 in storage 315. Cache 360 may be configured to maintain data that has been prefetched by application proxy components 350 based on prefetching models 355. In one implementation, cache 360 may also be configured to maintain data that has been retrieved in a traditional (i.e., non-prefetched) manner in response to direct user-initiated requests.

In order to efficiently optimize the use of cache 360, client-side prefetching component 305 may assign and periodically update aging values for both prefetched and non-prefetched data stored in cache 360. In one implementation consistent with aspects described herein, a rate at which an aging value is incremented may be governed, in some instances, by information included in or defined by prefetching models 355. For example, certain defined types of data may be aged more or less rapidly than other types of data. For example, email messages may be aged rapidly based on the premise (incorporated into prefetching model 355) that email not reviewed within the first 24 hours is unlikely to be reviewed. Similarly, documents that are updated frequently may be aged rapidly to avoid retrieval of an "old" version of the document. Other types of documents that are not updated as frequently (e.g., monthly reports, etc.), may having aging values incremented more slowly.

As the aging values associated with data stored in cache 360 increase beyond a threshold associated with the particular type of data, the stored data may be removed from cache 360, thereby providing storage space for additional prefetched or non-prefetched data to be retrieved. In an alternative implementation, data stored in cache 360 may be displaced by incoming data based on the aging values associated with the data. In this alternative implementation, data is maintained in cache 360 until additional space is needed for new data.

Based on stored prefetching models 355 and other general prefetching criteria, such as the time of day, activity on outgoing WAN interface 320, and processing load associated with network optimization device 150, client-side prefetching component 305 may request data from a remote resource (not shown) via outgoing WAN interface 320 prior to receipt of a request for such data from a client device connected via incoming private network interface 330. In one implementation, execution of data prefetching may only be performed in certain, predefined situations. For example, data prefetching based on a prefetching model 355 may only be performed when the processor 220 of network optimization device 150 is idle and when there is no activity on outgoing WAN interface 320. Details regarding an exemplary prefetching operation are set forth in detail below with respect to FIGS. 4-8.

In some implementations consistent with embodiments described herein, client-side prefetching component 305 may work in conjunction with server-side prefetching component 310 of a receiving network optimization device 150 to identify and retrieve data based on prefetching models 355. For example, server-side prefetching component 310 may be configured to retrieve or collect data for prefetching by client-side prefetching component 305, essentially pre-caching the data for prefetching prior to receiving a request from client-side prefetching component 305. Because server-side prefetching component 310 may be provided with a same (or similar) prefetching model 355 as client-side prefetching component 305, server-side prefetching component 310 may similarly indentify data that client-side prefetching component 305 may prefetch. In some embodiments, such data identification may be processor-intensive (e.g., data mining, etc.) and the offloading of such processing from a client-side prefetching component 305 to a server-side prefetching component may improve performance of the overall prefetching system. In other embodiments, server-side prefetching component 310 may have access to better statistical information than client-side prefetching component 305 due, at least in part, to the fact that server-side prefetching component 310 may be in communication with multiple client-side prefetching components 305. Accordingly, server-side prefetching component 310 may aggregate past data retrieval history or patterns, etc. to form a more accurate basis for prefetching content.

In an alternative implementation, client-side prefetching component 305 may transmit prefetching information or criteria to server-side prefetching component 310 via, for example, an out-of-band connection 375. Server-side prefetching component 310 may, upon receipt of the prefetching information, collect information designated or identified in the prefetching information. In this implementation, server-side prefetching component 310 only operates based on instructions received from client-side prefetching component 305. By enabling prefetching operations to be shared across both client-side prefetching component 305 and server-side prefetching component 310, the efficiency of the prefetching system may be increased.

Figure 4:
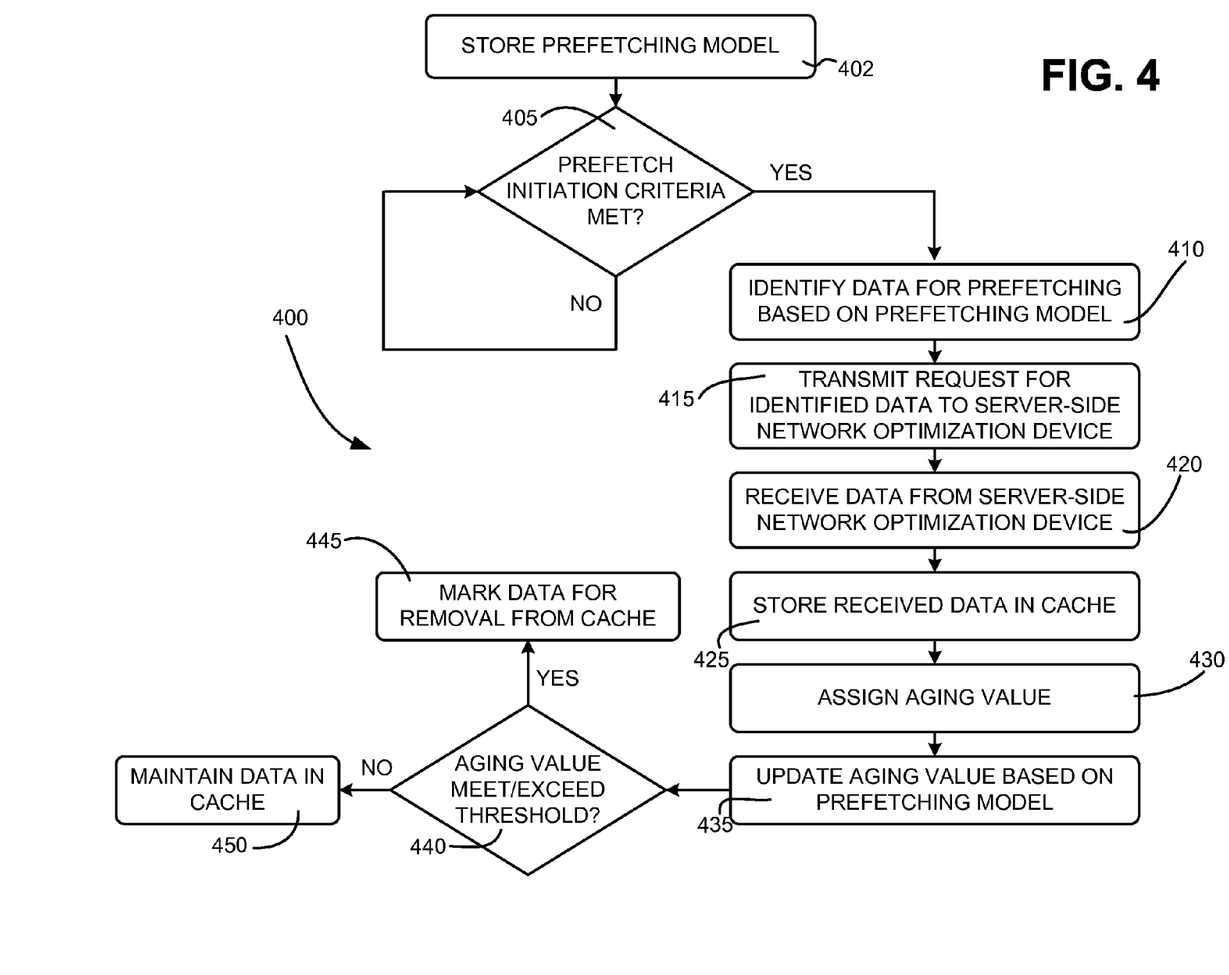
FIGS. 4 and 5 are flow diagrams illustrating an exemplary process for prefetching data across the WAN of FIG. 1 according to implementations described herein.
Figure 5:
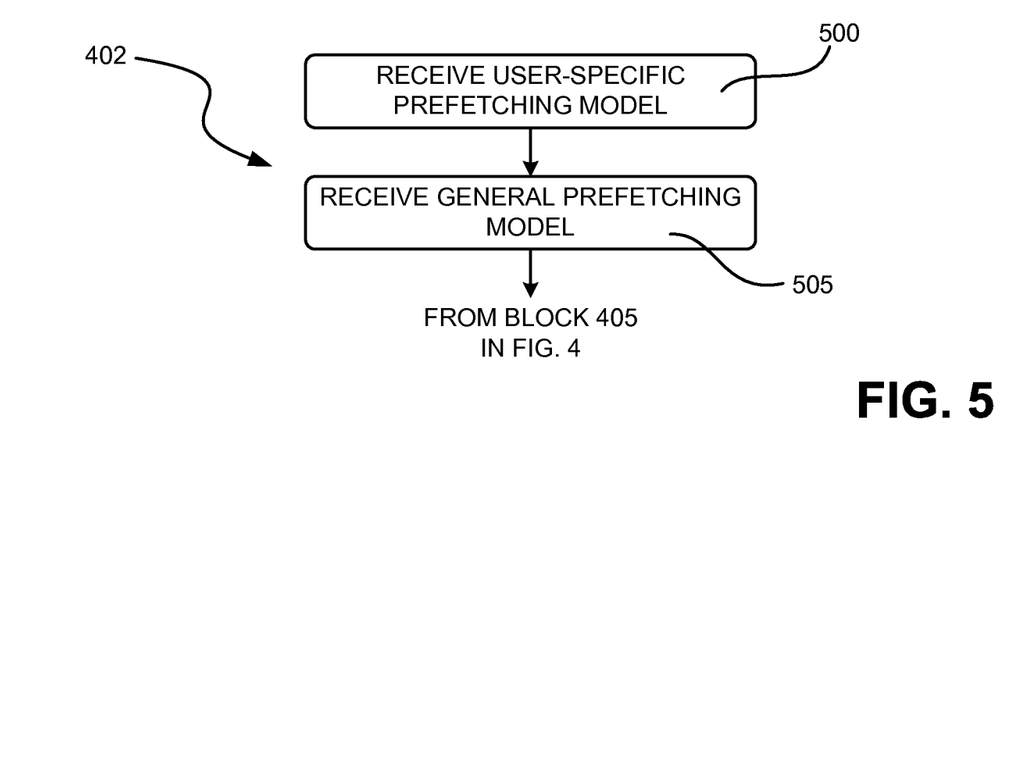

FIGS. 4 and 5 are flow diagrams illustrating an exemplary process 400 for prefetching data across WAN 170 according to implementations described herein. In one implementation, process 400 may be performed by a client-side network optimization device 150. In other implementations, some or all of process 400 may be performed by another device or group of devices, including or excluding network optimization device 150, such as, for example a network security device 115 or server 120.

As illustrated in FIG. 4, process 400 may begin with storage of a prefetching model 355 associated with an application proxy 350 running on device 150 (block 402). As described above, application proxies 350 are associated with a network application that may be run by a client device (e.g., device 110) associated with network optimization device 150. Additionally, as briefly described above, based on predefined criteria, application proxy 350 may perform data prefetching across WAN 170 based on prefetching model 355. Prefetching model 355 may include various elements of information that enable network optimization device 150 to identify data for prefetching based on specific applications and/or users.

Network optimization device 150 may determine whether prefetching initiation criteria have been satisfied (block 405). For example, network optimization device 150 may determine whether processor 220, associated with network optimization device 150, is idle or is below a predetermined activity threshold. In addition, network optimization device 150 may determine whether outgoing and incoming WAN interfaces 320/325 are below a predetermined activity level.

If it is determined that the prefetching initiation criteria have not been satisfied (block 405-NO), the process may return to block 405 following a predetermined polling interval. In some implementations, the polling interval may be dynamic based on various criteria, such as time of date, etc. If it is determined that the prefetching initiation criteria have been satisfied (block 405-YES), network optimization device 150 may identify data for prefetching based on prefetching model 355 (block 410). For example, prefetching model 355 may indicate that all word processing documents entitled "budget summary" should be prefetched for a particular user. As described above, processing of block 410 may be shared across both the client-side network optimization device 150 and the server-side network optimization device 150.

Once data has been identified for prefetching (and has been determined to not have been previously stored in cache 360), a request for the identified data may be transmitted across WAN 170 via outgoing WAN interface 320 to server-side network optimization device 150 (block 415). As described above, server-side network optimization device 150 may retrieve data corresponding to the request directly from the data source or from cache 360 maintained at server-side network optimization device 150. Data responsive to the outgoing request may be received at client-side network optimization device 150 via incoming WAN interface 325 (block 420) and stored in cache 360 (block 425) for potential transmission to a client device (e.g., device 110) upon receipt of a request.

An initial aging value may be assigned to the stored data (block 430). As described above, aging values may be used to determine when refreshed content should be received across WAN 170 and when to remove/replace the data with new or other data. The aging value may be updated/incremented based on information contained in prefetching model 355 (block 435). For example, aging values for certain types of data may be aged more quickly or less quickly than aging values for other types of data. It may be determined whether the updated aging value meets or exceeds a predetermined threshold (block 440). If so (block 440-YES), the data may be marked for removal or may be actually removed/deleted from cache 360 (block 445). If the updated aging value does not meet or exceed the predetermined threshold (block 440-NO) the data is maintained in cache 360 (block 450).

Process block 405 of FIG. 4 may, in one implementation, include the process blocks depicted in FIG. 5. As shown in FIG. 5, process block 405 may include receiving a user-specific prefetching model 365 (block 500). User-specific prefetching models 365 may include information associated with a unique user or group of users, such as a user's personnel status, past data retrieval history or patterns, user-assigned keywords, etc. A general prefetching model 370 may be received (block 505). General prefetching model 370 may include prefetching criteria associated with application data on a general level that does not include user-level elements or criteria. Exemplary general application-level prefetching criteria may include, for example, historical application-based document retrieval patterns for a multitude of users, document type definitions, prefetching exclusions, etc.

Figure 6:
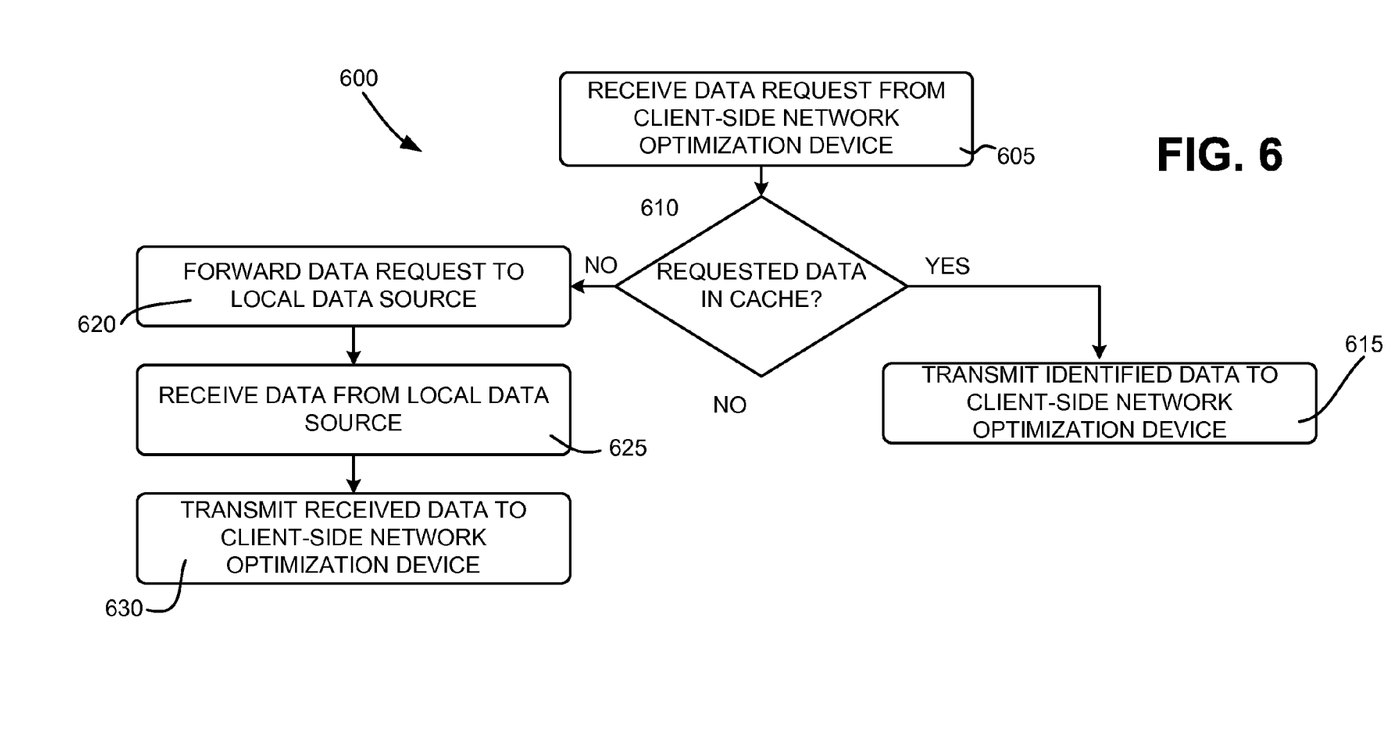
FIGS. 6-8 are flow diagrams illustrating additional exemplary processes for enabling prefetching of data across the WAN of FIG. 1 according to implementations described herein.
Figure 7:
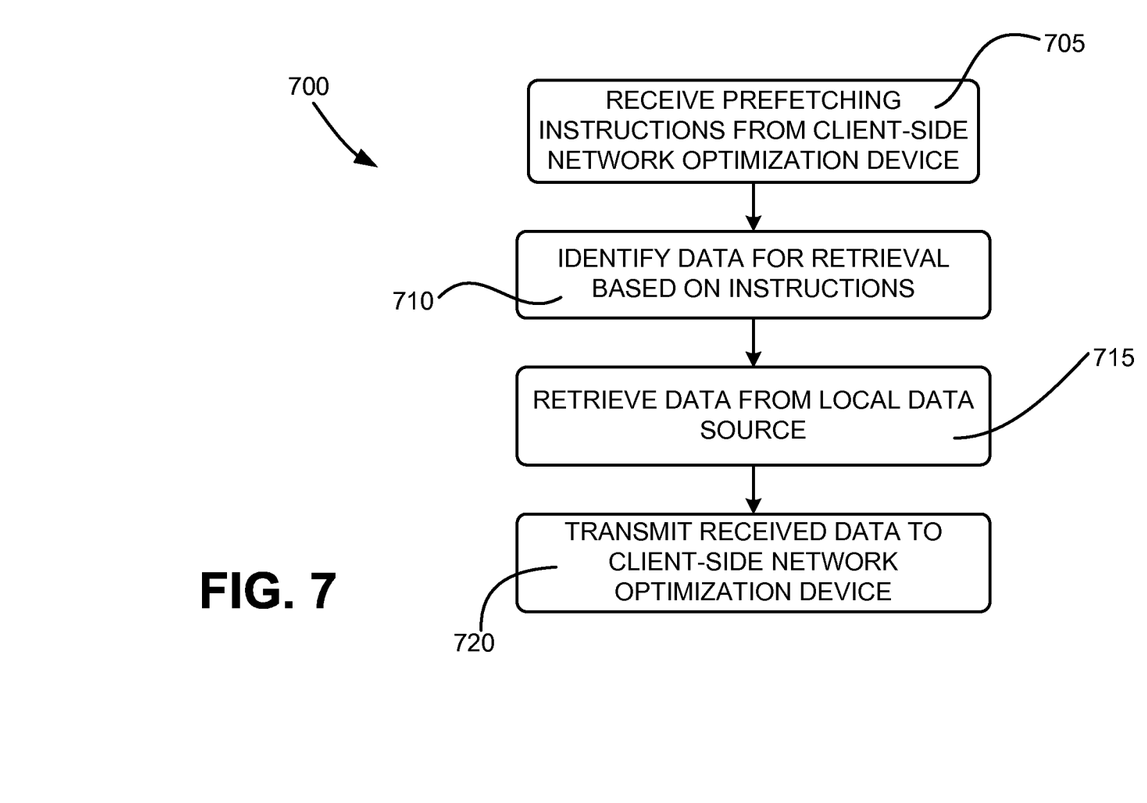
Figure 8:
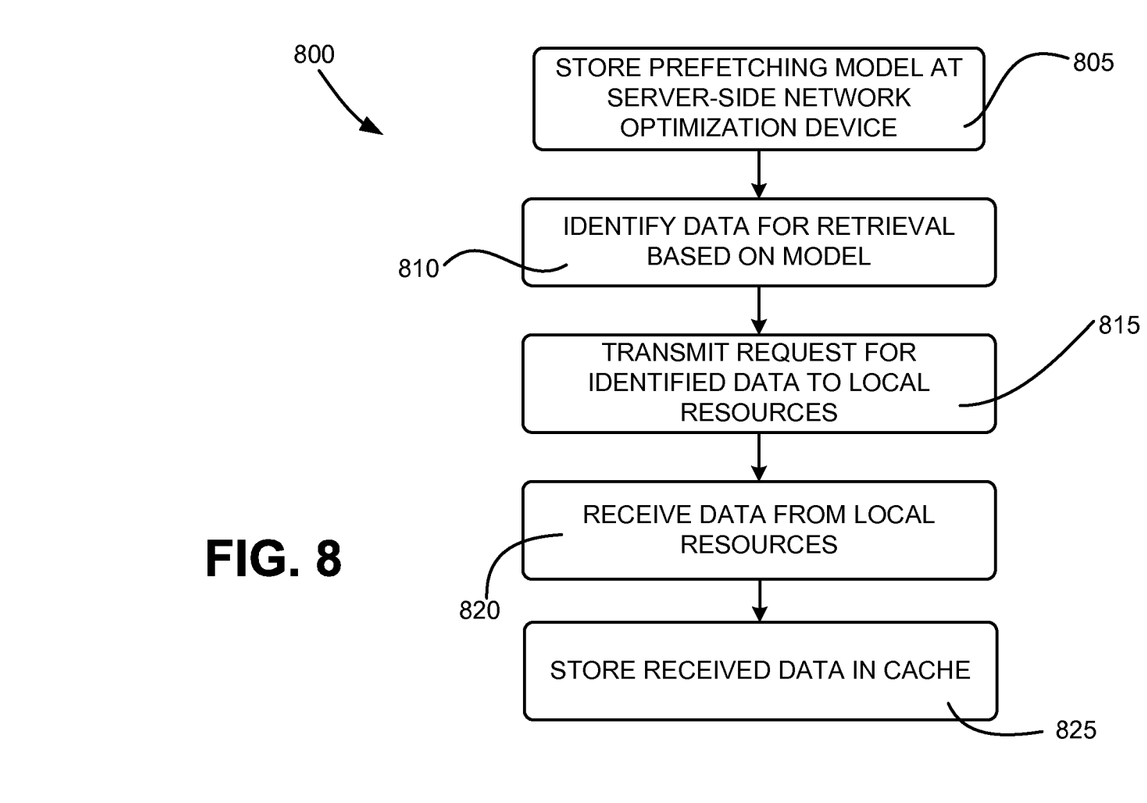

FIGS. 6-8 are flow diagrams illustrating exemplary processes 600, 700, and 800 for enabling prefetching of data across WAN 170 according to implementations described herein. In one implementation, processes 600, 700, and 800 may be performed by a server-side network optimization device 150. In other implementations, some or all of processes 600, 700, and 800 may be performed by another device or group of devices, including or excluding server-side network optimization device 150, such as, for example a network security device 115 or server 120.

As illustrated in FIG. 6, process 600 may begin with server-side network optimization device 150 receiving a request for data from client-side network optimization device 150 via WAN 170 (block 605). The received request may be based on prefetching processing performed by client-side network optimization device 150 or may be based on a traditional, client-based data request.

In response to the received request, server-side network optimization device 150 may determine whether data matching the request is maintained in cache 360 (block 610). If so (block 610-YES), the identified data is transmitted to client-side network optimization device 150 via WAN 170 (block 615). However, if the requested data is not maintained in cache 360 (block 610-NO), server-side network optimization device 150 may forward the request to a local data source via private network 180 (block 620). Server-side network optimization device 150 may receive responsive data from the local data source via private network 180 (block 625) and may transmit the received data to client-side network optimization device 150 via WAN 170 (block 630).

In the implementation described in FIG. 6, server-side network optimization device 150 may be unaware of the prefetching operations being performed by client-side network optimization device 150.

Referring to FIG. 7, process 700 may begin with server-side network optimization device 150 receiving prefetching instructions from client-side network optimization device 150 (block 705). For example, as described above, a prefetching model 355 associated with client-side network optimization device 150 may indicate that certain types of data are to be prefetched whenever possible. Identification of data to be prefetched may be processor-intensive or time consuming. In some instances, client-side network optimization device 150 may request that server-side network optimization device perform some of the processing. A decision on whether to request server-side network optimization device may be made based on information contained in the prefetching model 355 or may be made based on configuration information associated with client-side network optimization device 150.

Upon receipt of prefetching instructions from client-side network optimization device 150, server-side network optimization device 150 may identify data to be retrieved based on the received prefetching instructions (block 710). For example, server-side network optimization device 150 may receive instructions from client-side network optimization device 150 that data of a particular type is to be identified and retrieved for prefetching. Server-side network optimization device 150 may retrieve the identified data (e.g., from server devices on private network 180) (block 715) and may transmit the retrieved data to client-side network optimization device 150 (block 720). In one implementation, server-side network optimization device 150 may cache the retrieved information (e.g., in cache 360) for transmission upon request to client-side network optimization device 150, rather than unilaterally transmitting or "pushing" the data to client-side network optimization device 150.

Referring now to FIG. 8, process 800 may begin with server-side network optimization device 150 storing a prefetching model 355 (block 805). In some implementations, the prefetching model of block 805 may be the same or similar to prefetching model 355 stored by server-side network optimization device 150 in block 402 of FIG. 4. As with the prefetching model stored by client-side network optimization device 150, the prefetching model stored by server-side network optimization device 150 may also identify data to be prefetched by the client-side network optimization device. However, unlike the prefetching model described above in relation to the client-side network optimization device, the prefetching model of block 805 may be configured to enable server-side fetching of the identified data prior to transmission via WAN 170.

Server-side network optimization device 150 may identify data for prefetching based on the prefetching model 355 stored in block 805 (block 810). For example, prefetching model 355 may indicate that a nightly software build of a project having a keyword "brainstorm" should be prefetched via private network 180.

Once data has been identified for prefetching by server-side network optimization device 150, a request for the identified data may be transmitted across private network 180 via outgoing private network interface 335 to one or more local resources (block 815). Data responsive to the outgoing request may be received at server-side network optimization device 150 via incoming private network interface 330 (block 820) and stored in cache 360 (block 825) for potential transmission to client-side network optimization device 150 upon receipt of a request. In other implementations, the received data may be affirmatively transmitted or pushed to client-side network optimization device 150 via outgoing WAN interface 320. In one implementation, server-side network optimization device 150 may push or transmit the prefetched data relating to the general prefetching model to multiple connected client-side optimization devices 150. Transmitting to multiple client-side network optimization devices 150 may be based, for example, on available WAN bandwidth.

CONCLUSION

Systems and/or methods described herein may facilitate prefetching of data across a network. The systems and/or methods may base prefetching operations on a combination of condition information relating to the device performing the prefetching as well as prefetching model information relating to the types of data being prefetched. In one embodiment, prefetching models may be based on specific applications as well as specific users.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 4-8, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    storing, by a first device, a plurality of components, each of the plurality of components being associated with a different type of application;
    storing, by the first device, a plurality of prefetching models, each of the plurality of prefetching models corresponding to one of the plurality of components, the plurality of components each defining data, based on a type of application, of the different types of applications, to be prefetched;
    determining, by the first device, whether one or more prefetching criteria have been satisfied;
    identifying, by the first device and based on determining that the one or more prefetching criteria have been satisfied, data for prefetching based on one or more of the plurality of prefetching models;
    transmitting, by the first device and to a second device, a request for the identified data;
    receiving, by the first device and from the second device, the identified data;
    assigning, by the first device, an aging value to the identified data;
    incrementing, by the first device, the aging value, assigned to the identified data, at a predetermined rate, the predetermined rate being based on a type of application, of the different types of applications, associated with the identified data; and
    storing, by the first device and based on the incremented age value, the identified data.

2. The method of claim 1, where the type of application includes at least one of:
    an email application,
    a word processing application,
    a spreadsheet application, or
    a web browser application.

3. The method of claim 1, where the plurality of prefetching models include:
    at least one first prefetching model, the at least one first prefetching model including information associated with a user, and
    a second prefetching model, the second prefetching model including application-based document retrieval patterns.

4. The method of claim 1, further comprising:
    storing the aging value with the identified data.

5. The method of claim 1, further comprising:
    removing the identified data when the aging value is greater than a predetermined threshold.

6. The method of claim 1, where the prefetching criteria includes at least one of:
    a time of day,
    a network interface activity, or
    a processing load.

7. A device comprising:
    a processor to:
        store a plurality of components, each of the plurality of components being associated with a different type of application;
        store a plurality of prefetching models, each of the plurality of prefetching models being associated with particular data, based on a type of application, of the different types of applications, to be prefetched;
        determine whether one or more prefetching criteria have been satisfied;
        identify, based on determining that the one or more prefetching criteria have been satisfied, data for prefetching based on one or more of the plurality of prefetching models;
        transmit, to another device, a request for the identified data;
        receive, from the other device, the identified data; assign an aging value to the identified data;
        increment the aging value, assigned to the identified data, at a predetermined rate, the predetermined rate being based on a type of application, of the different types of applications, associated with the identified data; and
        store, based on the incremented age value, the identified data.

8. The device of claim 7, where the type of application includes at least one of:
    an email application,
    a word processing application,
    a spreadsheet application, or
    a web browser application.

9. The device of claim 7, where the plurality of prefetching models include:
    at least one first prefetching model, the at least one first prefetching model including information associated with a user, and
    a second prefetching model, the second prefetching model including application-based document retrieval patterns.

10. The device of claim 7, where the processor is further to:
    store the aging value with the identified data.

11. The device of claim 7, where the processor is further to:
    remove the identified data when the aging value is greater than a predetermined threshold.

12. The device of claim 7, where the prefetching criteria includes at least one of:
    a time of day,
    a network interface activity, or
    a processing load.

13. A system comprising:
    one or more devices, each device including at least one processor, to:
        store a plurality of components, each of the plurality of components being associated with a different type of application;
        store a plurality of prefetching models, each of the plurality of prefetching models being associated with particular data, based on a type of application, of the different types of applications, to be prefetched;
        determine whether one or more prefetching criteria have been satisfied;
        identify, based on determining that the one or more prefetching criteria have been satisfied, data for prefetching based on one or more of the plurality of prefetching models;
        transmit, to another device, a request for the identified data;

receive, from the other device, the identified data; assign an aging value to the identified data;

increment the aging value, assigned to the identified data, at a predetermined rate, the predetermined rate being based on a type of application, of the different types of applications, associated with the identified data; and store, based on the incremented age value, the identified data.

14. The system of claim 13, where the type of application includes at least one of:

an email application, a word processing application, a spreadsheet application, or a web browser application.

15. The system of claim 13, where the plurality of prefetching models include:

at least one first prefetching model, the at least one first prefetching model including information associated with a user, and a second prefetching model, the second prefetching model including application-based document retrieval patterns.

16. The system of claim 13, where the one or more devices are further to:

store the aging value with the identified data.

17. The system of claim 13, where the one or more devices are further to:

remove the identified data when the aging value is greater than a predetermined threshold.

18. The method of claim 1, further comprising:

marking the identified data for removal when the aging value is greater than a predetermined threshold.

19. The device of claim 7, where the processor is further to:

mark the identified data for removal when the aging value is greater than a predetermined threshold.

20. The system of claim 13, where the one or more devices are further to:

mark the identified data for removal when the aging value is greater than a predetermined threshold.

* * * * *